US007783985B2

(12) United States Patent  (10) Patent No.: US 7,783,985 B2
Indiran et al.  (45) Date of Patent: Aug. 24, 2010

(54) SYSTEMS AND METHODS FOR TRANSFERRING DATA BETWEEN COMPUTING DEVICES

(75) Inventors: Eric Indiran, Ventura, CA (US); Brian Green, Santa Barbara, CA (US); Derek Piasecki, Goleta, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 270 days.

(21) Appl. No.: 11/326,584

(22) Filed: Jan. 4, 2006

(65) Prior Publication Data

US 2007/0157101 A1  Jul. 5, 2007

(51) Int. Cl.
 *G06F 3/048* (2006.01)
(52) U.S. Cl. .................. 715/769; 715/748; 715/749
(58) Field of Classification Search ................. 715/769, 715/770, 772, 736, 748, 749, 751, 753
See application file for complete search history.

(56) References Cited

U.S. PATENT DOCUMENTS

| | | | |
|---|---|---|---|
| 4,949,248 A | 8/1990 | Caro | |
| 5,771,353 A | 6/1998 | Eggleston et al. | |
| 5,790,977 A | 8/1998 | Ezekiel | |
| 5,835,090 A | 11/1998 | Clark et al. | |
| 5,835,724 A | 11/1998 | Smith | |
| 5,838,910 A | 11/1998 | Domenikos et al. | |
| 5,862,325 A | 1/1999 | Reed et al. | |
| 5,896,533 A | 4/1999 | Ramos et al. | |
| 5,905,492 A | 5/1999 | Straub et al. | |
| 5,928,324 A | 7/1999 | Sloan et al. | |
| 5,990,852 A | 11/1999 | Szamrej | |
| 6,002,402 A | 12/1999 | Schacher | |
| 6,055,575 A | 4/2000 | Paulsen et al. | |
| 6,088,717 A | 7/2000 | Reed et al. | |
| 6,185,609 B1 | 2/2001 | Rangarajan et al. | |
| 6,219,669 B1 | 4/2001 | Haff et al. | |
| 6,233,600 B1 | 5/2001 | Salas et al. | |
| 6,233,617 B1 | 5/2001 | Rothwein et al. | |
| 6,263,363 B1 | 7/2001 | Rosenblatt et al. | |
| 6,289,382 B1 | 9/2001 | Bowman-Amuah | |
| 6,332,163 B1 | 12/2001 | Bowman-Amuah | |
| 6,339,832 B1 | 1/2002 | Bowman-Amuah | |
| 6,340,977 B1 | 1/2002 | Lui et al. | |
| 6,345,239 B1 | 2/2002 | Bowman-Amuah | |

(Continued)

FOREIGN PATENT DOCUMENTS

WO  WO-01/90912 A1  11/2001

OTHER PUBLICATIONS

Jupitermedia Corporation, Webopedia—"What is pull?", Oct. 15, 2004.*

*Primary Examiner*—Ba Huynh
(74) *Attorney, Agent, or Firm*—Goodwin Procter LLP (57) ABSTRACT

Systems and methods for extending the drag-and-drop data transfer mechanism to the remote access environment are described. The extension allows the end-user to select data located on the remote host or the local viewer, drag the selected data to a window on the host or viewer, and drop the selected data in the window. In response, the data is transferred via a network connecting the viewer and the host without any further input from the end-user.

54 Claims, 9 Drawing Sheets

U.S. PATENT DOCUMENTS

| | | |
|---|---|---|
| 6,345,288 B1 | 2/2002 | Reed et al. |
| 6,427,132 B1 | 7/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,571 B1 | 8/2002 | Haff et al. |
| 6,442,748 B1 | 8/2002 | Bowman-Amuah |
| 6,449,651 B1 | 9/2002 | Dorfman et al. |
| 6,473,794 B1 | 10/2002 | Guheen et al. |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,213 B1 | 12/2002 | Bowman-Amuah |
| 6,519,571 B1 | 2/2003 | Guheen et al. |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,584,569 B2 | 6/2003 | Reshef et al. |
| 6,594,692 B1 | 7/2003 | Reisman |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,611,862 B2 | 8/2003 | Reisman |
| 6,611,867 B1 | 8/2003 | Bowman-Amuah |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,631,512 B1 | 10/2003 | Onyeabor |
| 6,633,742 B1 | 10/2003 | Turner et al. |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,658,464 B2 | 12/2003 | Reisman |
| 6,691,301 B2 | 2/2004 | Bowen |
| 6,715,145 B1 | 3/2004 | Bowman-Amuah |
| 6,721,713 B1 | 4/2004 | Guheen et al. |
| 6,731,625 B1 | 5/2004 | Eastep et al. |
| 6,742,015 B1 | 5/2004 | Bowman-Amuah |
| 6,757,710 B2 | 6/2004 | Reed |
| 6,789,252 B1 | 9/2004 | Burke et al. |
| 6,807,668 B2 * | 10/2004 | Stern et al. ................... 719/329 |
| 6,816,904 B1 | 11/2004 | Ludwig et al. |
| 6,842,906 B1 | 1/2005 | Bowman-Amuah |
| 6,850,956 B1 | 2/2005 | Knutson |
| 6,867,880 B2 | 3/2005 | Silverbrook et al. |
| 6,920,502 B2 | 7/2005 | Araujo et al. |
| 6,957,186 B1 | 10/2005 | Guheen et al. |
| 6,987,581 B2 | 1/2006 | Silverbrook et al. |
| 6,995,859 B1 | 2/2006 | Silverbrook et al. |
| 6,996,530 B2 | 2/2006 | Shizuka et al. |
| 7,034,953 B2 | 4/2006 | Silverbrook et al. |
| 7,047,498 B2 | 5/2006 | Lui et al. |
| 7,117,504 B2 | 10/2006 | Smith et al. |
| 7,127,501 B1 | 10/2006 | Beir et al. |
| 7,165,041 B1 | 1/2007 | Guheen et al. |
| 7,225,244 B2 | 5/2007 | Reynolds et al. |
| 2001/0047406 A1 | 11/2001 | Araujo et al. |
| 2002/0029285 A1 | 3/2002 | Collins |
| 2002/0032725 A1 | 3/2002 | Araujo et al. |
| 2002/0072927 A1 | 6/2002 | Phelan et al. |
| 2002/0184224 A1 | 12/2002 | Haff et al. |
| 2002/0188726 A1 | 12/2002 | Schick et al. |
| 2003/0014442 A1 | 1/2003 | Shiigi et al. |
| 2003/0046586 A1 | 3/2003 | Bheemarasetti et al. |
| 2003/0046587 A1 | 3/2003 | Bheemarasetti et al. |
| 2003/0093466 A1 * | 5/2003 | Jarman et al. ............... 709/203 |
| 2003/0156142 A1 | 8/2003 | Nonaka et al. |
| 2003/0191799 A1 | 10/2003 | Araujo et al. |
| 2003/0208529 A1 | 11/2003 | Pendyala et al. |
| 2004/0002048 A1 | 1/2004 | Thurmaier et al. |
| 2004/0049515 A1 | 3/2004 | Haff et al. |
| 2004/0070608 A1 * | 4/2004 | Saka .......................... 345/748 |
| 2005/0144186 A1 | 6/2005 | Hesselink et al. |
| 2005/0149481 A1 | 7/2005 | Hesselink et al. |
| 2006/0041635 A1 | 2/2006 | Alexander et al. |
| 2006/0064716 A1 | 3/2006 | Sull et al. |
| 2006/0152575 A1 * | 7/2006 | Amiel et al. ............. 348/14.01 |
| 2006/0294307 A1 * | 12/2006 | Summers et al. ............ 711/115 |
| 2007/0157100 A1 | 7/2007 | Wiggen |
| 2007/0162589 A1 * | 7/2007 | Riddle ........................ 709/223 |
| 2008/0313236 A1 | 12/2008 | Vijayakumar et al. |
| 2009/0030971 A1 | 1/2009 | Trivedi et al. |

* cited by examiner

SYSTEMS AND METHODS FOR TRANSFERRING DATA BETWEEN COMPUTING DEVICES

FIELD OF THE INVENTION

The invention relates to transferring data from one computing device to another computing device. More specifically, the invention relates to transferring data from a first computing device to a second computing device using a drag-and-drop operation.

BACKGROUND OF THE INVENTION

Drag-and-drop is an intuitive way to transfer data between applications on a computing device. The drag-and-drop feature of object linking and embedding (OLE) is primarily a shortcut for copying and pasting data. Typically, when an end-user uses the clipboard to copy or paste data, a number of steps are required. The end-user selects the data, clicks cut or copy from the Edit menu, moves to the destination file, window, or application, places the cursor in the desired location, and click Paste from the Edit menu.

When the end-user uses OLE drag and drop, the end-user removes two steps from the process. The end-user selects the data from the source window (the "drop source"), drags it to the desired destination (the "drop target"), and drops the selected data by releasing the mouse button. This operation eliminates the need for menus and is quicker than the copy/paste sequence. The only requirement is that both the drop source and drop target must be open and at least partially visible on the screen.

It would be useful if this drag-and-drop functionality was extended to provide the same type of intuitive data transfer in the remote access environment.

SUMMARY OF THE INVENTION

The present invention extends the drag-and-drop data transfer mechanism to the remote access environment. Generally speaking, the end-user can select data located on the remote host or the local viewer, drag the selected data to a window on the viewer or host, and drop the selected data in the window. In response, the data is transferred via the network connecting the viewer and the host without any further input from the end-user.

In one aspect the invention features, a method of transferring data from a viewer computing device to a host computing device using a drag-and-drop operation. The viewer computing device is in communication with and located remotely from the host computing device and provides access to the host computing device through a window displaying a representation of the screen display of the host computing device. The method includes receiving, via an input device in electrical communication with the viewer computing device, user input indicating selection of data stored by the viewer computing device, receiving, via the input device, user input indicating that the selected data is dropped into a portion of a window displaying a representation of the screen display of the host computing device, and transferring the selected data from the viewer computing device to the host computing device in response to the data being dropped.

In another aspect the invention features, a method of transferring data from a host computing device to a viewer computing device using a drag-and-drop operation. The viewer computing device is in communication with and located remotely from the host computing device and provides access to the host computing device through a window displaying a representation of the screen display of the host computing device on the viewer computing device. The method includes receiving, via an input device in electrical communication with the viewer computing device, user input indicating selection of data stored by the host computing device, receiving, via the input device, user input indicating that the selected data is dropped into a window associated with the viewing computing device, and receiving the selected data from the host computing device in response to the data being dropped.

In still another aspect the invention features, a method of transferring data from a viewer computing device to a host computing device using a drag-and-drop operation. The viewer computing device is in communication with and located remotely from the host computing device and provides access to the host computing device through a window displaying a representation of the screen display of the host computing device on the viewer computing device. The method includes registering at least a portion of a window displaying a representation of the screen display of the host computing device as a drop target and receiving, via an input device in electrical communication with the viewing computing device, selection of data stored on the viewing computing device. The method also includes receiving, via the input device, user input indicating that the selected data is dropped onto the registered drop target and transferring the dropped data to the host computing device in response to the data being dropped.

In yet another aspect, the invention features, a method of transferring data from a host computing device to a viewer computing device using a drag-and-drop operation. The viewer computing device is in communication with and located remotely from the host computing device and provides access to the host computing device through a window displaying a representation of the screen display of the host computing device on the viewer computing device. The method includes receiving, via an input device in electrical communication with the viewing computing device, selection data stored on the host computing device and registering a window created on the host computing device as a drop target. The method also includes registering at least a portion of the window displaying the representation of the screen display of host computing device as a drop source, receiving, via the input device, user input indicating that the selected data is dropped into another window of the viewer computing device, and transferring the selected data to the viewer computing device in response to the data being dropped.

Still another aspect of the invention is the creation of a drag-and-drop proxy target on the viewer computing device and a drag-and-drop source on the host computing device. These proxies transmits the drag-and-drop data across the network, because the drag-and-drop source and drag-and-drop target are located on different computing devices.

In yet another aspect of the invention, the selected data is converted prior to transmission. The conversion includes transforming the references to the selected data (e.g., a file path) into the actual selected data itself (a data stream). This is because references are only valid on the source computing device. The conversion of data formats can be generalized such that the data is converted to match a format that is supported by the drag-and-drop target.

Still other aspects of the invention feature providing instructions on a computer readable medium that facilitate the drag-and-drop methods described below.

BRIEF DESCRIPTION OF THE DRAWINGS

The advantages of this invention, described above, and further advantages, may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
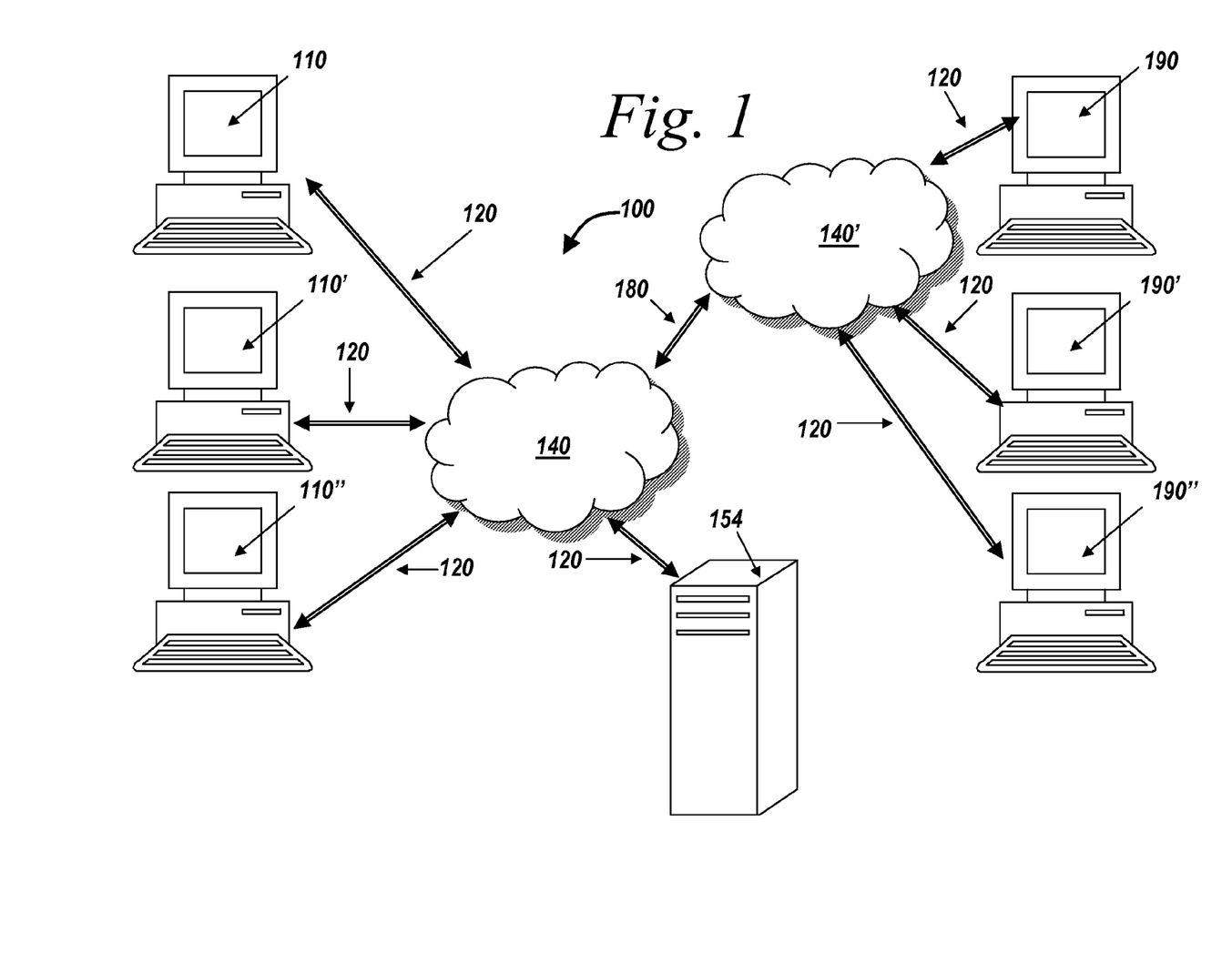
FIG. 1 shows an embodiment of a remote access computing environment.

With reference to FIG. 1, a remote access computing environment 100 in which principles of the present invention can be practiced includes one or more viewer computing devices 110, 110', 110" (hereinafter each viewer or plurality of viewers is generally referred to as viewer 110) in communication with one or more host computing devices 190, 190', 190" (hereinafter each host or plurality of hosts is generally referred to as host 190) via communications network 140 through communications links 120. The communications network 140 can be a personal area network (PAN), local-area network (LAN), a medium-area network (MAN), or a wide area network (WAN) such as the Internet or the World Wide Web. The communication links 120 can be a variety of connections including standard telephone lines, LAN or WAN links (e.g., T1, T3, 56 kb, X.25), broadband connections (e.g., ISDN, Frame Relay, ATM), and wireless connections (e.g., IEEE 802.11 and Bluetooth). The viewers 110 communicate with the hosts 190 through the network 140 using a variety of communication protocols (e.g., TCP/IP, IPX, SPX, NetBIOS, NetBEUI, and direct asynchronous protocols).

The viewers 110 can also communicate with the hosts 190 through a second network 140', through a communication link 180 that connects network 140 to the second network 140'. The protocols used to communicate through communications link 180 can include any variety of protocols used for long haul or short transmission. For example, TCP/IP, IPX, SPX, NetBIOS, NetBEUI, SONET and SDH protocols. The combination of the networks 140, 140' can be conceptually thought of as the Internet. As used herein, Internet refers to the electronic communications network that connects computer networks and organizational computer facilities around the world.

The viewer 110 can be any personal computer, server, Windows-based terminal, Network Computer, wireless device, information appliance, RISC Power PC, X-device, workstation, minicomputer, personal digital assistant (PDA), main frame computer, cellular telephone or other computing device that provides sufficient faculties to execute viewer software and an operating system. Viewer software of the invention facilitates displaying a representation of a screen display of the host computing device 190 and provides a drag-and-drop facility to transfer data between the host 190 and the viewer 110. As used herein, data refers to any digital representation of information. Examples of data include, but are not limited to files, folders, e-mails, instant messages (IM), audio files, video files, profiles, drivers, programs, and other electronic embodiments of information.

The host 190 can be any type of computing device that is capable of communication with the viewer 110. For example, the host computing device 190 can be any of the computing devices that are viewer computing devices. In addition, the host computing device 190 can be any other computing device that provides sufficient faculties to execute host software and an operating system. The host software of the invention provides a drag-and-drop facility to transfer files between the host 190 and the viewer 110.

The viewer 110 and host 190 can communicate directly with each other or through an intermediary computing or communication device. For example, in some embodiments a communication server 154 facilitates communications between the viewer 110 and the host 190. The communications server 154 can provide a secure channel using any number of encryption schemes to provide communications between the viewer 110 and the host 190. One remote access product that currently uses such a communication scheme is GOTOMYPC offered by Citrix Online, LLC of Santa Barbara Calif. Certain aspects and features of the invention described below can be embodied in such a service. Other services that can include features of the invention can include, but are not limited too, CITRIX METAFRAME, provided by Citrix Systems, Inc. of Ft. Lauderdale Fla., WEBEX PCNOW offered by WebEx Communications, Inc. of Santa Clara Calif., LOGMEIN offered by 3am Labs, Inc. of Woburn, Mass., REMOTELY ANYWHERE also offered by 3am Labs, and PROVISION MANAGEMENT FRAMEWORK offered by Provision Networks.

Figure 2:
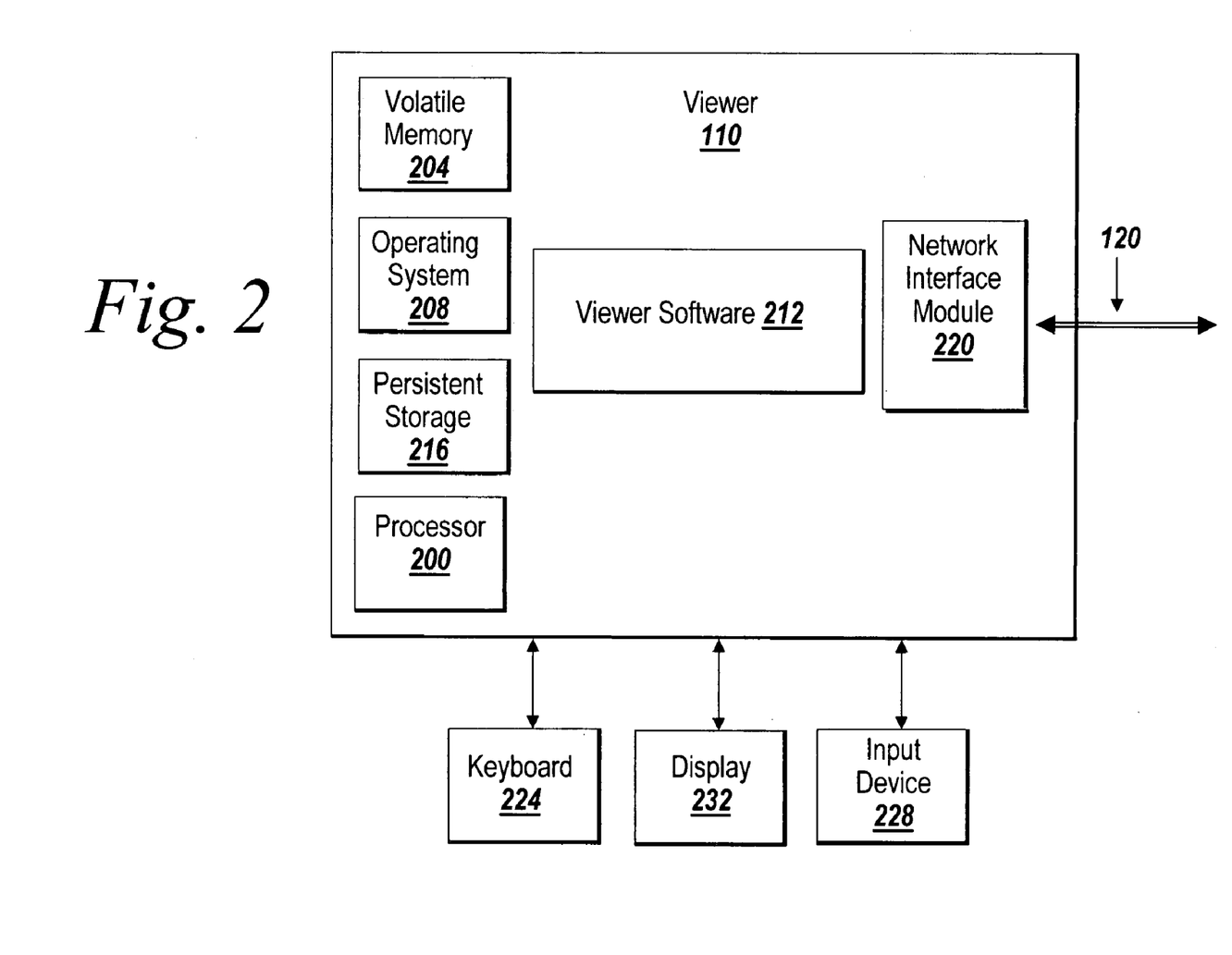
FIG. 2 shows an embodiment of a viewer computing device of the remote access computing environment of FIG. 1.

FIG. 2 depicts a conceptual block diagram of a viewer 110 of the remote access computing environment 100. It should be understood that other embodiments of the host can include any combination of the following elements or include other elements not explicitly listed. In one embodiment, each viewer 110 typically includes a processor 200, volatile memory 204, an operating system 208, viewer software 212, a persistent storage memory 216 (e.g., hard drive or external hard drive), a network interface 220 (e.g., a network interface card), a keyboard 224 or virtualized keyboard in the case of a PDA, at least one input device 228 (e.g., a mouse, trackball, space ball, light pen and tablet, touch screen, stylus, and any other input device) in electrical communication with the viewer 110, and a display 232. The operating system 116 can include, without limitation, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, Java, PALM OS, SYMBIAN OS, LINSPIRE, LINUX, SMARTPHONE OS, the various forms of UNIX, WINDOWS 2000 SERVER, WINDOWS 2000 ADVANCED SERVER, WINDOWS NT SERVER, WINDOWS NT SERVER ENTERPRISE EDITION, MACINTOSH OS X SERVER, UNIX, SOLARIS, VMWARE and the like.

The viewer software 212 is in communication with various components (e.g., the operating system 208) of the viewer 110 to provide features of the invention. As a general overview, the viewer software 212 includes instructions that allow the end-user of the viewer 110 to access the host 190 through the Internet or other similar network. The desktop of the host 190 is displayed to the end-user of the viewer 110 in a window on the display 232. As discussed in further detail below, the viewer software 212 also includes instructions to facilitate the drag-and-drop file transfer between the viewer 110 and the host 190.

As a general overview, the viewer software 212 interacts with the operating system 208 to register certain windows on the viewer 110 as either a drop target window or drop source window. Whether a window is registered as a drop source window or a drop target window with the viewer 110 operating system 208 depends on the direction of the drag-and-drop transfer. That is, whether the transfer is occurring from the viewer 110 to the host 190 or from the host 190 to the viewer 110. Additionally, the viewer software 212 notifies the host 190 that a drag-and-drop transfer is occurring.

Figure 3:
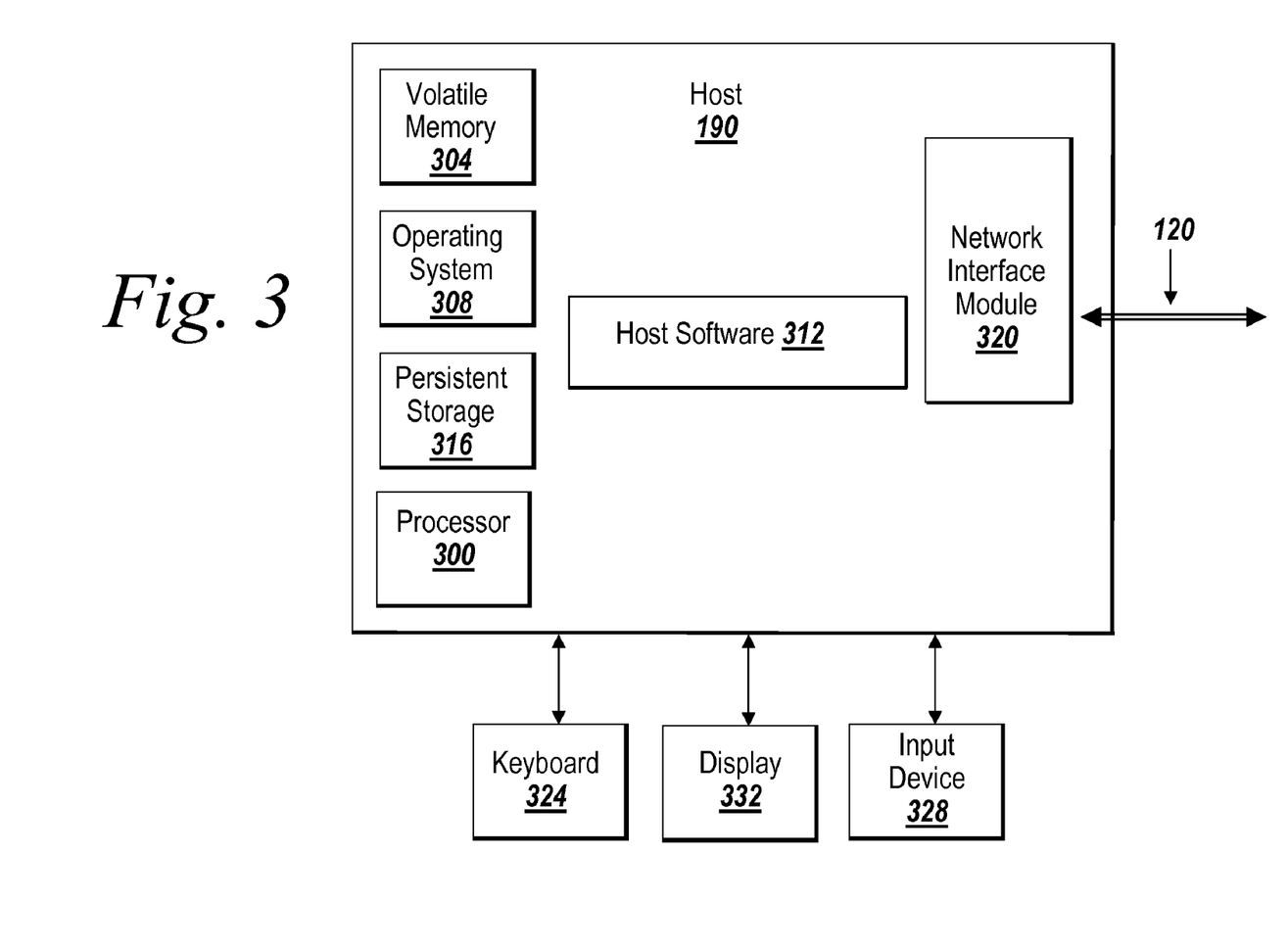
FIG. 3 shows an embodiment of a host computing device of the remote access computing environment of FIG. 1.

With reference to FIG. 3, an embodiment of a host 190 for user in the remote access computing environment 100 is described. It should be understood that other embodiments of the host can include any combination of the following elements or include other elements not explicitly listed. The host 190 includes a processor 300, a volatile memory 304, an operating system 308, host software 312, persistent storage memory 316, a network interface 320, a keyboard 324, at least one input device 328 (e.g., a mouse, trackball, space ball, bar code reader, scanner, light pen and tablet, stylus, and any other input device), and a display 332. The server operating system can include, but is a not limited to, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, Java, PALM OS, SYMBIAN OS, LINSPIRE, LINUX, SMARTPHONE OS, the various forms of UNIX, WINDOWS 2000 SERVER, WINDOWS 2000 ADVANCED SERVER, WINDOWS NT SERVER, WINDOWS NT SERVER ENTERPRISE EDITION, MACINTOSH OS X SERVER, UNIX, SOLARIS, VMWARE and the like.

The host software 312 is in communication with various components (e.g., the operating system 208) of the viewer 190 to provide features of the invention. As a general overview, the host software 312 includes instructions that allow the end-user of the viewer 110 to access the host 190 through the Internet or other similar network. As discussed in further detail below, the host software 312 also includes instructions to facilitate the drag-and-drop file transfer between the viewer 110 and the host 190.

As a general overview, the host software 312 interacts with the operating system 308 to register certain windows on the host 190 as either a drop target window or drop source window. Whether a window is registered as a drop source window or a drop target window with the host 190 operating system 308 depends on the direction of the drag-and-drop transfer. That is, whether the transfer is occurring from the viewer 110 to the host 190 or from the host 190 to the viewer 110.

Figure 4A:
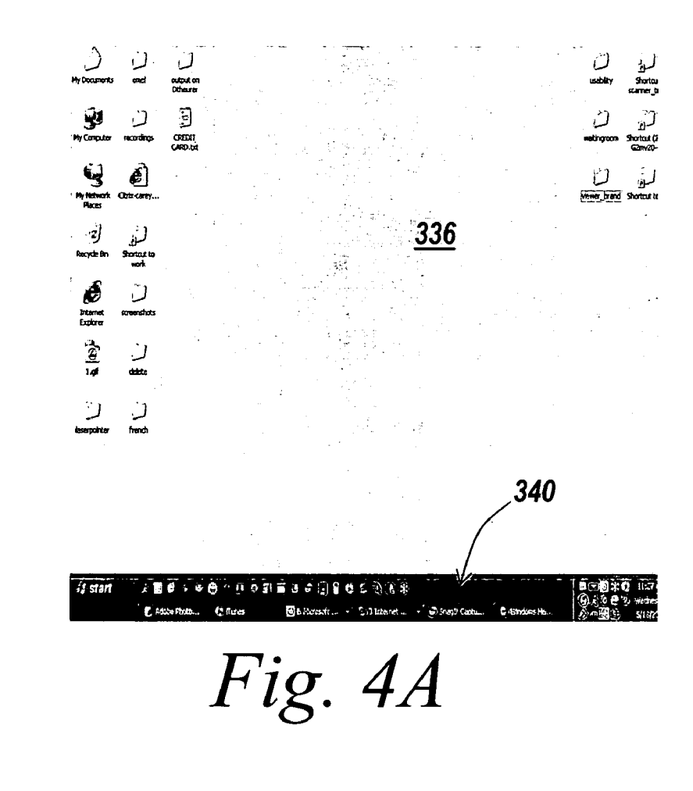
FIG. 4A is a screen shot of an embodiment of a desktop of a host computing device.
Figure 4B:
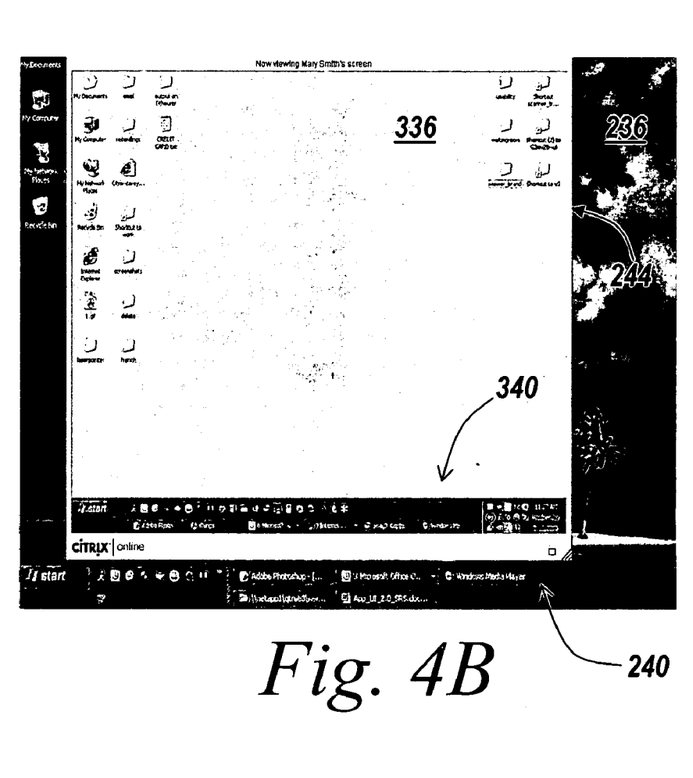
FIG. 4B is a screen shot of an embodiment of a desktop of a viewer computing device providing access to the host computing device through a window displaying the desktop of the host computing device of FIG. 4A.

With reference to FIGS. 4A and 4B, embodiments of screen shots of the host 190 desktop 336 and a viewer 110 desktop 236 are shown and described. It should be understood that although described as a WINDOWS based desktop, the principles of the invention apply equally to other graphical based operating systems (e.g., MAC OS X and LINSPIRE). In one embodiment as shown in FIG. 4A, the host desktop 336 includes various icons that represent various known computing objects. For example, the icons can represent shortcuts to launch applications, folders to store data and files, and means to launch applications. In addition, the host desktop 336 includes a taskbar 340 that display which applications are currently executing on the host 190.

As shown in FIG. 4B, one embodiment the viewer 100 desktop 236 includes various icons that represent various known computing objects. For example, the icons can represent shortcuts to launch applications, folders to store data and files, and means to launch applications. In addition, the viewer desktop 236 includes a taskbar 240 that display which applications are currently executing on the viewer 110. Also shown on the desktop 236 of the viewer 110 is a window 244 that provides a representation of the of a screen display of the host computing device 190 desktop 336.

The end-user of the viewer 110 accesses the host 190 through the window 244. The end-user can control the host 190 using the input device 228 of the viewer 110. The end-user can launch programs on the host 190 (e.g., the end-users e-mail program) and access files stored local on the host 190. The programs that are executing on the host 190 are shown in the task bar 340 of the host 190. One embodiment, of the present invention provides a means to select data on either the host 190 via window 244 or the viewer and transfer the selected data using a drag-and-drop facility. In essence, the end-user is performing a data transfer across the Internet (or network) using a drag-and-drop procedure.

Figure 5:
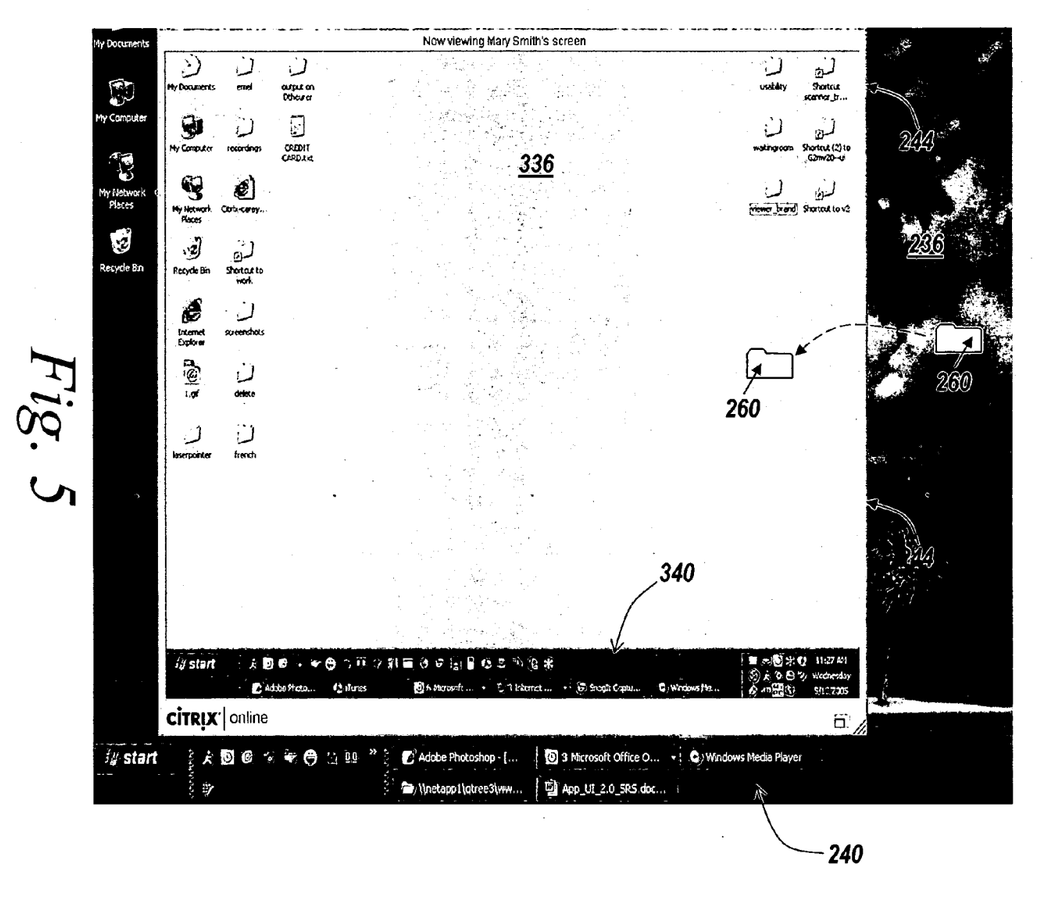
FIG. 5 is a screen shot of an embodiment depicting a data transfer from the viewer to the host.
Figure 6:
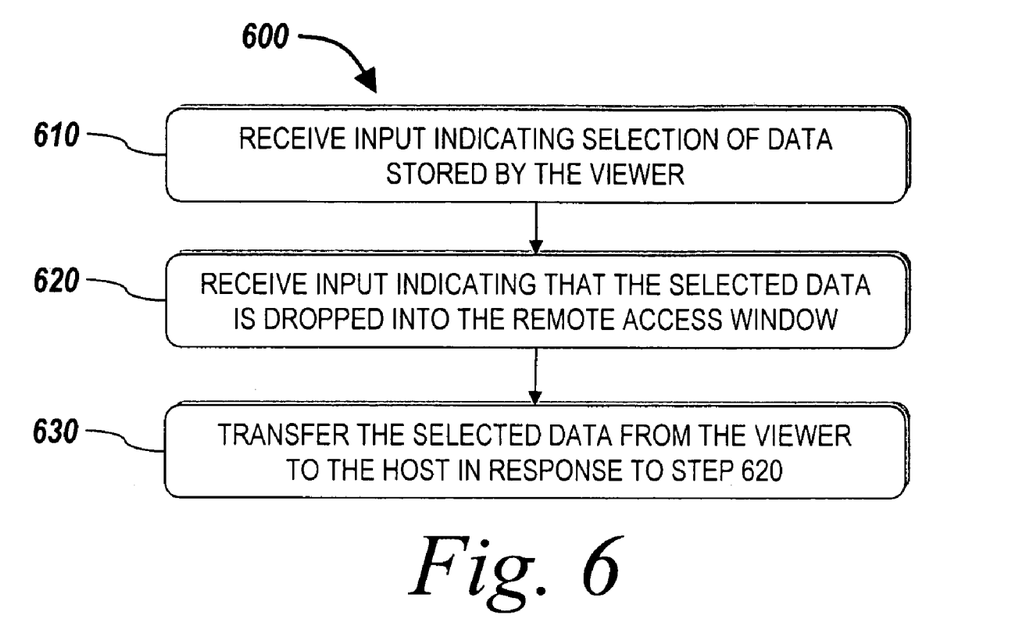
FIG. 6 is a flow chart depicting an embodiment of a method of transferring data from the viewer to the host.

With reference to FIG. 5 and FIG. 6, an embodiment of a method of transferring data from the viewer 110 to the host 190 is described. As shown in FIG. 5, the end-user of the viewer 110 selects the folder 260, drags the folder to the window 244, and drops the folder 260 onto the desktop 336 of the host 190. In response, a copy of the folder or the actual folder itself, is copied or moved to the host 190. In one embodiment, a window (not shown) is displayed to the end-user that the transfer operation is occurring and also the status of the transfer.

As shown in FIG. 6, one embodiment of the method 600 includes receiving (step 610) end-user input indicating the selection of data stored or accessible by the viewer 110, receiving (step 620) end-user input indicating that the selected data was dropped into the window 244, which displays a representation of the screen display (e.g., the desktop) of the host 190, and transferring (step 630) the selected data in response to the selected data being dropped in the window 244. Said another way, the end-user of the viewer 110 is selecting both the drag-and-drop source on the viewer 110 computing device (by selecting the drag-and-drop data) and the drag-and-drop target on the host computing device 190 (which is defined by the position at which the end-user drops the drag-and-drop data in the window 244). Once the end-user selects the drag-and-source on the client computing device and the drag-and-drop target on the host computing device, the present invention transmits the drag-and-drop data across the communication link 120 from drag-and-drop source on the viewer computing device 10 to the drag-and-drop target on the host computing device 190.

In one embodiment, receiving (step 610) end-user input includes receiving communications from the input device 228 of the viewer 110. For example, the end-user selects a file stored on the viewer 110 by clicking and holding the left or right mouse button. In another embodiment, the end-user selects a file by touching a region of a touch screen. The input device commands are communicated to the viewer 110 using method known to those skilled in the art.

In one embodiment, receiving (step 620) indication that the selected data was dropped into the window 244 includes receiving communications from the input device 228 of the viewer 110. For example, the end-user releases the left or right mouse button after dragging the selected data into the window 244. In another embodiment, the end-user drops the file by removing their finger from the touch screen. The input device commands are communicated to the viewer 110 using method known to those skilled in the art.

The transferring (step 630) occurs when the host 190 requests the data from the viewer 110. In one embodiment, the host software 312 requests the data from the viewer 110. In response, the viewer software 212 responds by providing the selected data via the network 140 to the host 190. Further details of the transfer procedure are provided below.

Figure 7A:
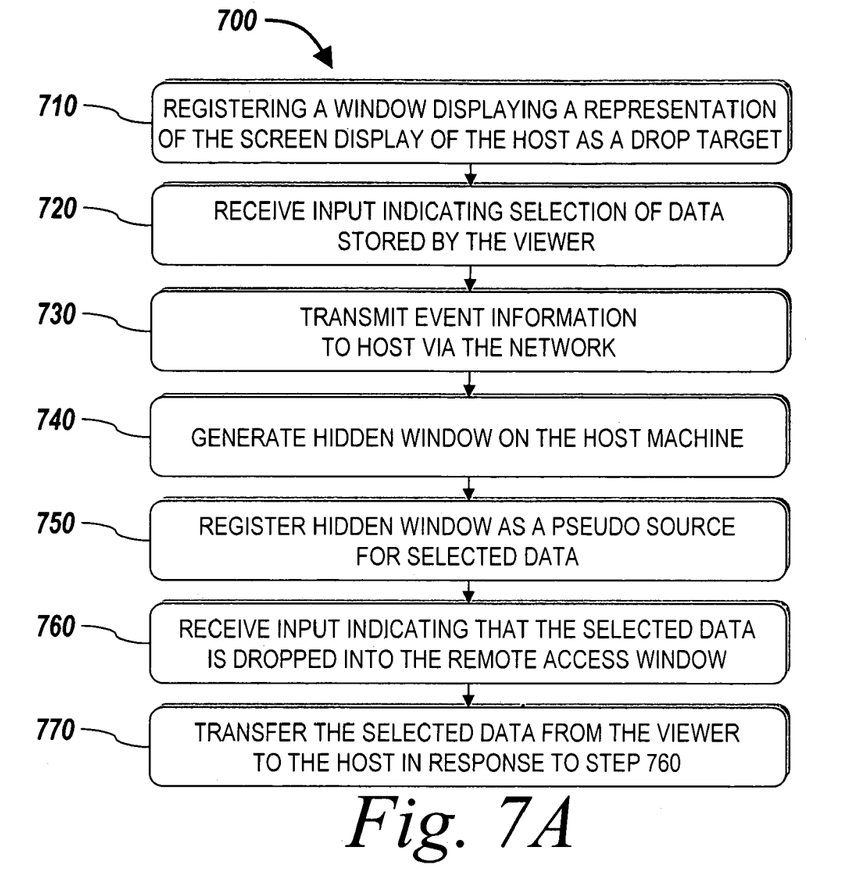
FIG. 7A is a flow chart depicting an embodiment of a method of transferring data from the viewer to the host.

With reference to FIG. 7A, an embodiment of a method 700 of transferring data from the viewer 110 to the host 190 is described in more detail. The method 700 includes registering (step 710) at least a portion of a window 244 displaying a representation of the screen display of the host 190 as a drop target, receiving (step 720) input indicating selection of a data stored by the viewer 110 and transmitting (step 730) event information to the host 190 via the network 140. The method also includes generating (step 740) a hidden window on the host 190 in response to the receiving the event information and registering (step 750) the hidden window as a pseudo source for the selected data with the host 190. Further, the method 700 includes receiving (step 760) input indicative that the selected data is dropped into the remote access window 244 and transferring (step 770) the selected data to the host 190 in response to selected data being dropped in the remote access window 244.

In order to initiate a drag-and-drop data transfer from the viewer 110 to the host 190, the end-user of the viewer selects data on the viewer 110. The end-user drags the selected data to the window 244, which provides access to the host 190. In order to ensure the data is transferred to the host 190 various system level operations are performed, as described below.

In one embodiment, the window 244 registers with the operating system 208 of the viewer 110 as a "drop target." As used herein, drop target refers to a computing object that is capable of receiving data during a drag-and-drop operation. Assume for the sake of example that the operating system 208 of the viewer 110 is WINDOWS XP. As part of the registration as a drop target, the window 244 backs a system defined IDataObject. In general terms, the IDataObject Interface provides a format-independent mechanism for transferring data. As is known, the IDataObject interface is used by the Clipboard class and in drag-and-drop operations. In one embodiment, the window 244 registers as a drop target when the window 244 is created. In another embodiment, the window 244 registers as a drop target with the operating system 208 when the end-user drags the selected data into the window 244. In another embodiment, only a portion of the window 224 registers as drop target. For example, an application window (not shown) within the window 244 registers as a drop target.

In order to determine that the end-user selected and dragged the selected data, input device commands are received (step 720). For example, the end-user selects a file stored on the viewer 110 by clicking and holding the left or right mouse button. In another embodiment, the end-user selects data by touching a region of a touch screen. The input device commands are communicated to the viewer 110 using method known to those skilled in the art.

As the end-user drags the selected data into the window 244, a DragEnter occurs on the viewer 110. When the DragEnter event occurs on the viewer 110, the viewer software 212 signals the host machine 190 that the DragEnter event occurred. In one embodiment, the viewer software 212 transmits (step 730) the occurrence of the DragEvent to the host 190 using the protocol that establishes the connection between the viewer 110 and the host 190 across the network 140. As part of the notification to the host 190, the viewer software 212 transmits information related the IDataObject interface provided by the window 244. The IDataObject information exposes the selected data to the host 190 when the selected data is dropped into the window 244.

After receiving notification of the DragEnter event, the host software 312 begins preparing for the drag-and-drop transfer. As part of the preparation, the host software 312 instructs the operating system 308 to create (step 740) a window on the host 190. In one embodiment, the newly created window is a hidden window. That is, the window is not visible to the end-user via the window 244 that is providing access to the host 190. For example, the hidden window can be a transparent window or created in an off-screen area. In another embodiment, the hidden window is not hidden at all and is instead a window that is visible to the end-user.

The host software 190 registers (step 750) the newly created window as a "drop source." As used herein, drop source refers to any computing object that is capable of providing data to a drop target. Registering the hidden window as a drop source informs the host 190 that applications running on the host can call the hidden window to receive the selected data as part of the drag-and-drop operation. In essence, the hidden window is a "pseudo source" for the selected data. The actual source of the selected data is the viewer 110. The IDataObject provided by the viewer 110 to the host 190 is associated with the hidden window on the host 190. The association creates a "link" between the window 244 and the hidden window of the host 190.

After establishing the link between the hidden window of the host 190 and the window 244 of the viewer 110, the transfer of the selected file occurs. To that end, the end-user drops the selected data in the window 244 and the viewer received (step 760) indication that this event occurred. For example, the end-user releases the left or right mouse button after dragging the selected data into the window 244. In another embodiment, the end-user drops the file by removing their finger from the touch screen. The input device commands are communicated to the viewer 110 using method known to those skilled in the art.

An indication that the drop of the selected file occurred in the window 244 is communicated to the host 190 via network 140. In response, the host software 312 initiates a drag-and-drop transfer (step 770) on the host 190 by requesting the selected data from the hidden window. In one embodiment, the transfer operation can be conceptually thought of as the hidden window of the host 190 requesting the selected data from window 244, which is registered as a drop target of the viewer 110. In response, the viewer 110 responds by providing the selected data via the network 140 to the host 190.

Figure 7B:
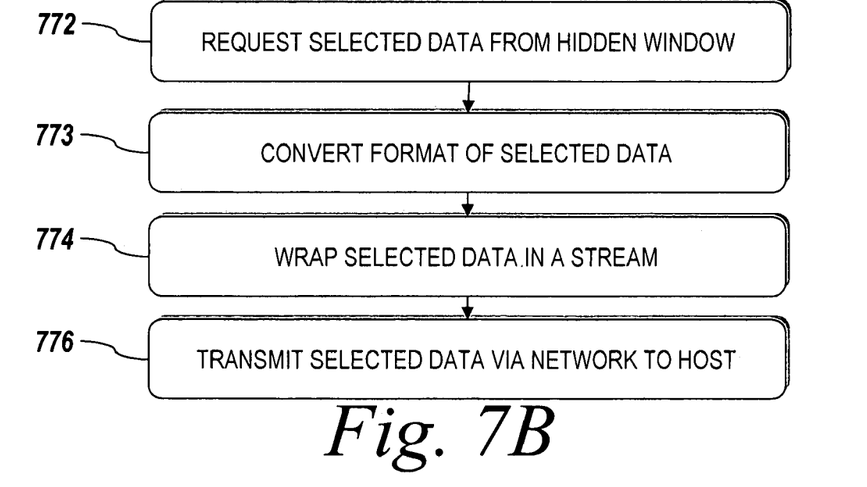
FIG. 7B is a flow chart depicting details an embodiment of a method of transferring data from the viewer to the host.

An embodiment of the step of transferring (step 770) the selected data from the viewer is described with reference to FIG. 7B. From the perspective of the host 190 the drag-and-drop operation is occurring on the host 190. The fact that the transfer is actually occurring via the network 140 between the host 190 and the viewer 110 is transparent to the host 190, the viewer 100, and the end-user. To begin the transfer operation the host 190 requests (step 772) the selected data from the hidden window. This request is in turn brokered by the host software 312 to the drop target window 244 of the viewer. In response the viewer software 212 wraps (step 774) the selected data in a stream and transmits (step 776) the wrapped data the host 190 via the network 140.

In one embodiment, the request to the hidden window of the host 190 asks for the IDataObject associated with the hidden window. In response, the IStream interface for the selected data is provided to the host software 312. In turn, the host software 312 requests the selected data from the drop target window 244 of the viewer 110.

In response to the request, the viewer 110 wraps the requested data in an IStream wrapper and transmits (step 776) the requested data to the host 190. In one embodiment, the transfer occurs according to the protocol used in the connection established between the viewer 110 and the host 190.

In order to transfer the selected data as part of using an IStream wrapper, the format of the selected data is converted (step 773). As used herein, conversion refers to advertising the actual contents of the selected data and not the path of the selected data, and the like. The purpose for converting the selected data is that the WINDOWS OS and its other application programs (e.g., Explorer) only advertise the path of the selected data when dropping the selected data onto a drop target, but not the actual contents of the selected data. When dragging the selected data between the host 190 and viewer 110, the advertisement of the path is not of use. This is because the drop target would interpret the path as a local path, not as a path on the remote computer. For example, assume that the end-user is dragging the file "c:\text.doc" from the host 190 to the viewer 110. Without doing a format conversion, the drop target on the viewer 110 would receive the path "c:\text.doc" and attempt to copy the contents of the local file "c:\text.doc" (which may or may not exist) to the drop target. If the file "c:\text.doc" does exist on the drop target the contents of the file are most likely different than the contents of the same-named file on the drop source. The present invention addresses this issue by converting the format of the selected data to the actual contents of the selected data not just the path of the selected data. To summarize format conversion, the original drop source provides only a file path of the selected data (instead of a stream), the present invention converts that file path into the actual contents of the selected data and advertises the selected data as a file stream.

Although described as a drag-and-drop from the viewer 110 to the host 190, the principles of invention apply equally to a drag-and-drop operation from the host 190 to the viewer. Details of this type of transfer are described below.

Figure 8:
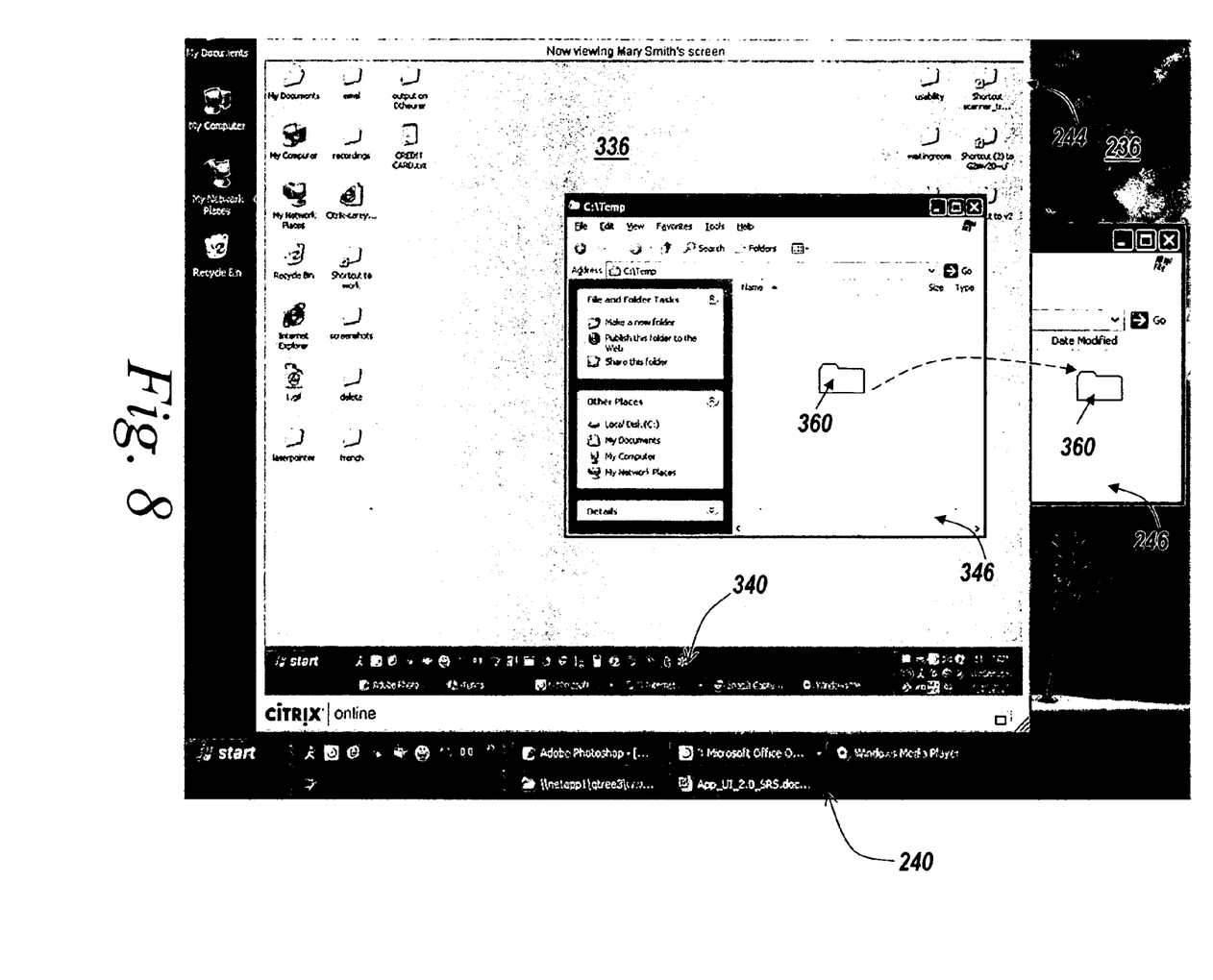
FIG. 8 is a screen shot of an embodiment depicting a data transfer from the host to the viewer.
Figure 9:
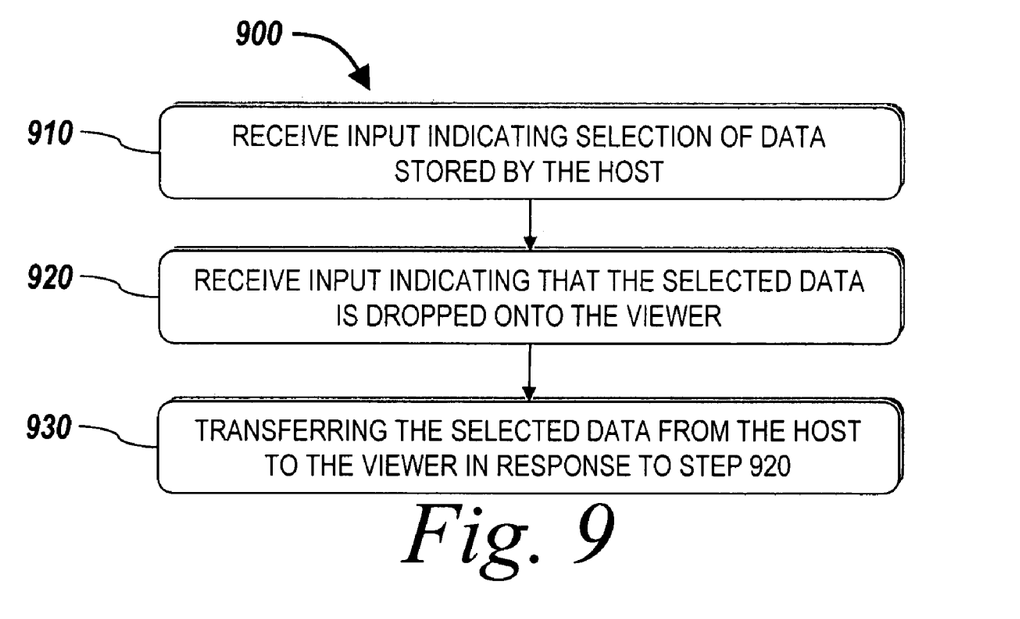
FIG. 9 is a flow chart depicting an embodiment of a method of transferring data from the host to the viewer.

With reference to FIG. 8 and FIG. 9, an embodiment of a method of transferring data from the host 190 to the viewer 110 is described. As shown in FIG. 8, the end-user of the viewer 110 selects the folder 360 in application window 346 within in the window 244 that provides access to the host 190, drags the folder 360 out of the window 244, and drops the folder 360 onto another application window 246 displayed on the desktop 236 of the viewer 110. As used herein, application window refers to any window displayable on the host 190 or the viewer 110. Exemplary applications windows include, but are not limited to, explore windows, e-mail application windows, word processing application windows, instant messaging windows, database application windows, and the like. It should be understood that there are many other types of application windows within the scope of the invention. In response, a copy of the folder, or the actual folder itself, is copied or moved to the viewer 110. In one embodiment, a window (not shown) is displayed to the end-user that the transfer operation is occurring and also the status of the transfer.

As shown in FIG. 9, one embodiment of the method 900 includes receiving (step 910) end-user input indicating the selection of data stored or accessible by the host 190, receiving (step 920) end-user input indicating that the selected data was dropped onto the viewer 110 (e.g., the desktop 236 of the host 110 or another application window 246 of the desktop 236), and transferring (step 930) the selected data to the viewer 110 in response to the selected data being dropped onto the viewer 110.

In one embodiment, receiving (step 910) end-user input includes receiving communications from the input device 238 of the viewer 110. For example, the end-user selects a file stored on the host 190 by clicking and holding the left or right mouse button. In another embodiment, the end-user selects a file by touching a region of a touch screen.

In one embodiment, receiving (step 920) indication that the selected data was dropped onto the viewer 110 includes receiving communications from the input device 228 of the viewer 110. For example, the end-user releases the left or right mouse button after dragging the selected data onto the viewer 110. In another embodiment, the end-user drops the file by removing their finger from the touch screen.

In one embodiment, the transferring (step 930) occurs when the viewer 110 requests the data from the host 190. The viewer software 212 requests the data from the host 190. In response, the host software 312 responds by providing the selected data via the network 140 to the viewer 110. Further details of the transfer procedure are provided below.

Figure 10:
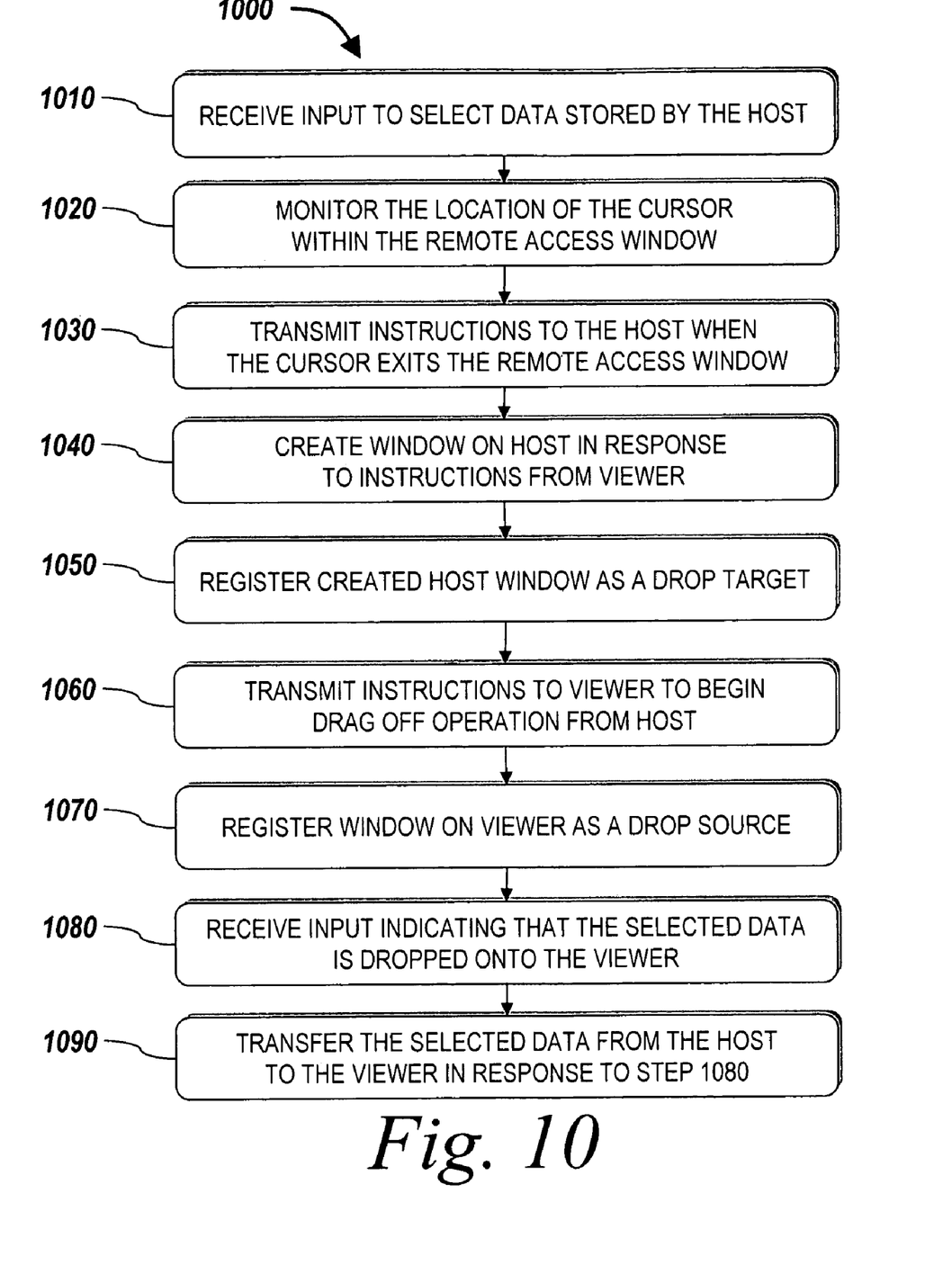
FIG. 10 is a flow chart depicting an embodiment of a method of transferring data from the host to the viewer.

With reference to FIG. 10, an embodiment of a method 1000 of transferring data from the host 190 to the viewer 110 is described in more detail. The method 1000 includes receiving (step 1010) input to select data stored by the host 190, monitoring (step 1020) the location of the cursor of the viewer 110 within the remote access window 244, and transmitting (step 1030) instructions to the host 190 from the viewer software 212 when the cursor exits the remote access window 244. Also, the method includes creating (step 1040) a window on the host 190 in response to the receiving the instructions from the viewer 110, registering (step 1050) the created window as drop target, and transmitting (step 1060) instructions from the host software 312 to the viewer 110 to begin a drag off operation. Further the method 1000 includes registering (step 1070) the remote access window 244 a drop source, receiving (step 1080) input indicating that the selected data was dropped onto the viewer 110, and transferring (step 1090) the selected data from the host 190 to the viewer 110.

In order to initiate a drag-and-drop data transfer from the host 190 to the viewer 110, the end-user selects data stored on the host 190 via the remote access window 244. The viewer software 212 receives (step 1010) indication of the selection of the data. In response, a state mechanism monitors (step 1020) the location of the cursor within the remote access window 244. In one embodiment, the viewer software 212 monitors the cursor location using traditional WINDOWS programming mechanisms. In another embodiment, a separate software module (not shown) monitors the cursor locations. Said another way, to initiate a drag-and-drop from the host 190 to the viewer 110, the end-user selects data and holds down the right or left mouse button while dragging the selected data from the window 244 to a location on the viewer 110.

When the cursor of the viewer 110 exits the remote access window 244 with the selection of the data of the host 190, the viewer software 212 transmits (step 1030) instructions to the host 190. In one embodiment, the instructions essentially inform the host 190 that a drag off event may be beginning.

In response to receiving the instructions, the host software 312 instructions the operating system 308 of the host 190 to create (step 1040) a window. In one embodiment, the created window is a hidden window. That is, the window is not visible to the end-user via the window 244 that is providing access to the host 190. For example, the hidden window can be a transparent window or created in an off-screen area. In another embodiment, the hidden window is not hidden at all and is instead a window that is visible to the end-user. The created window on the host registers (step 1050) with the operating system 308 as a drop target using traditional WINDOWS programming mechanisms. Creating the hidden window allows the IDataObject of the selected data on host to be exposed and transmitted to the viewer 110. One method of exposing the IDataObject is to "synthesize" a drop command on the host 190. In other words, a fake "drop" command is executed on the host 190 thereby exposing the IDataObject on the host 190.

After registering the created window on the host 190, the host software 312 transmits (step 1060) to the viewer 110 that the window was created and instructs the viewer 110 to begin a drag off operation, as previously described.

In response to the receiving the communication from the host 190, the viewer software 212 registers (step 1070) the remote access window 244 as a drop source with the operating system 208 of the viewer 110. In essence, the remote access window 244 is a "pseudo source" for the selected data. The actual source of the selected data is the host 190. The IDataObject exposed by the created host window is provided to the remote access window 244. In essence a link is created between the window 244 and the hidden window of the host 190.

After establishing the link between the hidden window of the host 190 and the window 244 of the viewer 110, the transfer of the selected file occurs. To that end, the end-user drops the selected data onto the viewer 110 and the viewer receives (step 1080) indication that this event occurred. For example, the end-user releases the left or right mouse button after dragging the selected data out of the remote access window 244. In another embodiment, the end-user drops the file by removing their finger from the touch screen. The input device commands are communicated to the viewer 110 using method known to those skilled in the art.

An indication that the drop of the selected file occurred outside the remote access window 244 is communicated to the host 190 via network 140. In response, the viewer software 212 initiates a drag-and-drop transfer (step 1090) on the viewer 110 by requesting the selected data from the hidden window of the host 190. In one embodiment, the transfer operation can be conceptually thought of as the remote access window 244 of the viewer 110 requesting the selected data from the hidden window of the host 190, which is registered as a drop target. In response, the host 190 responds by providing the selected data via the network 140 to the viewer 110. The transfer of the selected data occurs using the IStream mechanisms as described above with reference to FIG. 7B.

From the perspective of the viewer 110 the drag-and-drop operation is occurring on the viewer 110. The fact that the transfer is actually occurring via the network 140 between the host 190 and the viewer 110 is transparent to the host 190, the viewer 100, and the end-user.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present invention.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of transferring data from a viewer computing device to a host computing device using a drag-and-drop operation, the viewer computing device in communication with and located remotely from the host computing device and providing access to the host computing device through a window displaying a representation of the screen display of the host computing device on the viewer computing device, the method comprising:

(a) receiving, via an input device in electrical communication with the viewer computing device, user input indicating selection of data stored by the viewer computing device and dragging of the selected data into the window displaying the representation of the screen display of the host computing device;

(b) transmitting a notification to the host computing device that the selected data has been dragged into the window displaying the representation of the screen display of the host computing device, the notification enabling the host computing device to create thereon, in preparation for the drag-and-drop transfer, a window that is not visible to a user of the viewer computing device;

(c) establishing a link between the window that is not visible to the user of the viewer computing device and the window displaying the representation of the screen display of the host computing device;

(d) receiving, via the input device, user input indicating that the selected data is dropped into the window displaying the representation of the screen display of the host computing device; and (e) transmitting the selected data from the viewer computing device to the host computing device in response to the host computing device requesting the selected data from the window that is not visible to the user of the viewer computing device.

2. The method of claim 1 further comprising converting the format of the selected data prior to transmitting the selected data.

3. The method of claim 1 wherein transmitting the selected data comprises transmitting actual data referred to by the selected data, the reference to the actual data being supplied by a drop source of the viewer computing device.

4. The method of claim 3 wherein the reference to the actual data is a file path.

5. The method of claim 1 wherein the window displaying the representation of the screen display of the host computing device is a graphical representation of a drag-and-drop target and wherein transmitting the selected data comprises streaming the selected data from the viewer computing device to the drag-and-drop target on the host computing device.

6. The method of claim 1 wherein the host computing device and the viewer computing device communicate via the Internet.

7. The method of claim 1 wherein the data is a file.

8. A method of transferring data from a host computing device to a viewer computing device using a drag-and-drop operation, the viewer computing device in communication with and located remotely from the host computing device and providing access to the host computing device through a window displaying a representation of the screen display of the host computing device on the viewer computing device, the method comprising:
 (a) receiving, via an input device in electrical communication with the viewer computing device, user input indicating selection of data stored by the host computing device and dragging of the selected data out of the window displaying the representation of the screen display of the host computing device;
 (b) transmitting a notification to the host computing device that the selected data has been dragged out of the window displaying the representation of the screen display of the host computing device, the notification enabling the host computing device to create thereon, in preparation for the drag-and-drop transfer, a window that is not visible to a user of the viewer computing device;
 (c) establishing a link between the window that is not visible to the user of the viewer computing device and the window displaying the representation of the screen display of the host computing device;
 (d) receiving, via the input device, user input indicating that the selected data is dropped into a window associated with the viewer computing device;
 (e) requesting the selected data from the window, on the host computing device, that is not visible to the user of the viewer computing device; and
 (f) receiving the selected data from the host computing device in response to step (e).

9. The method of claim 8 further comprising converting the format of the selected data prior to receiving the selected data.

10. The method of claim 8 wherein receiving the selected data comprises receiving actual data referred to by the selected data, the reference to the actual data being supplied by a drop source of the host computing device.

11. The method of claim 10 wherein the reference to the actual data is a file path.

12. The method of claim 8 wherein the window associated with the viewer computing device is a graphical representation of a drag-and-drop target and wherein receiving the selected data comprises receiving a stream of the selected data by the drag-and-drop target of the viewer computing device from the host computing device.

13. The method of claim 8 wherein the host computing device and the viewer computing device communicate via the Internet.

14. The method of claim 8 wherein the data is a file.

15. A method of transferring data from a viewer computing device to a host computing device using a drag-and-drop operation, the viewer computing device in communication with and located remotely from the host computing device and providing access to the host computing device through a window displaying a representation of the screen display of the host computing device on the viewer computing device, the method comprising:
 (a) registering the window displaying the representation of the screen display of the host computing device as a drop target;
 (b) receiving, via an input device in electrical communication with the viewer computing device, user input indicating selection of data stored on the viewer computing device and dragging of the selected data into the registered drop target;
 (c) transmitting a notification to the host computing device that the selected data has been dragged into the registered drop target, the notification enabling the host computing device to create thereon, in preparation for the drag-and-drop transfer, a window that is not visible to a user of the viewer computing device;
 (d) establishing a link between the window that is not visible to the user of the viewer computing device and the registered drop target;
 (e) receiving, via the input device, user input indicating that the selected data is dropped onto the registered drop target; and
 (f) transmitting the selected data to the host computing device in response to the host computing device requesting the selected data from the window that is not visible to the user of the viewer computing device.

16. The method of claim 15 further comprising converting the format of the selected data prior to transmitting the selected data.

17. The method of claim 15 wherein transmitting the selected data comprises transmitting actual data referred to by the selected data, the reference to the actual data being supplied by a drop source of the viewer computing device.

18. The method of claim 17 wherein the reference to the actual data is a file path.

19. The method of claim 15 wherein transmitting the selected data comprises streaming the selected data from the viewer computing device to a drop target on the host computing device.

20. The method of claim 15 wherein the host computing device and the viewer computing device communicate via the Internet.

21. The method of claim 15 wherein the data is a file.

22. A method of transferring data from a host computing device to a viewer computing device using a drag-and-drop operation, the viewer computing device in communication with and located remotely from the host computing device and providing access to the host computing device through a window displaying a representation of the screen display of the host computing device on the viewer computing device, the method comprising:
 (a) registering the window displaying the representation of the screen display of the host computing device as a drop source;
 (b) receiving, via an input device in electrical communication with the viewer computing device, user input indicating selection of data stored on the host computing device and dragging of the selected data out of the registered drop source;
 (c) transmitting a notification to the host computing device that the selected data has been dragged out of the registered drop source, the notification enabling the host computing device to create thereon, in preparation for the drag-and-drop transfer, a window that is not visible to a user of the viewer computing device;

(d) establishing a link between the window that is not visible to the user of the viewer computing device and the registered drop source;

(e) receiving, via the input device, user input indicating that the selected data is dropped into another window of the viewer computing device;

(f) requesting the selected data from the window, on the host computing device, that is not visible to the user of the viewer computing device; and (g) receiving the selected data from the host computing device in response to step (f).

23. The method of claim 22 further comprising converting the format of the selected data prior to receiving the selected data.

24. The method of claim 22 wherein receiving the selected data comprises receiving actual data referred to by the selected data, the reference to the actual data being supplied by a drop source of the host computing device.

25. The method of claim 24 wherein the reference to the actual data is a file path.

26. The method of claim 22 wherein the other window of the viewer computing device is a graphical representation of a drag-and-drop target and wherein receiving the selected data comprises receiving a stream of the selected data by the drag-and-drop target of the viewer computing device.

27. The method of claim 22 wherein the host computing device and the viewer computing device communicate via the Internet.

28. The method of claim 22 wherein the data is a file.

29. An article of manufacture storing computer readable instructions thereon to cause a transfer of data from a viewer computing device to a host computing device using a drag-and-drop operation, the viewer computing device in communication with and located remotely from the host computing device and providing access to the host computing device through a window displaying a representation of the screen display of the host computing device on the viewer computing device, the article of manufacture comprising:

(a) instructions to receive, via an input device in electrical communication with the viewer computing device, user input indicating selection of data stored by the viewer computing device and dragging of the selected data into the window displaying the representation of the screen display of the host computing device;

(b) instructions to transmit a notification to the host computing device that the selected data has been dragged into the window displaying the representation of the screen display of the host computing device, the notification enabling the host computing device to create thereon, in preparation for the drag-and-drop transfer, a window that is not visible to a user of the viewer computing device;

(c) instructions to establish a link between the window that is not visible to the user of the viewer computing device and the window displaying the representation of the screen display of the host computing device;

(d) instructions to receive, via the input device, user input indicating that the selected data is dropped into the window displaying the representation of the screen display of the host computing device; and (e) instructions to transmit the selected data from the viewer computing device to the host computing device in response to the host computing device requesting the selected data from the window that is not visible to the user of the viewer computing device.

30. The article of manufacture of claim 29 further comprising instructions to convert the format of the selected data prior to transmitting the selected data.

31. The article of manufacture of claim 29 wherein the instructions to transmit the selected data comprise instructions to transmit actual data referred to by the selected data, the reference to the actual data being supplied by a drop source of the viewer computing device.

32. The article of manufacture of claim 31 wherein the reference to the actual data is a file path.

33. The article of manufacture of claim 29 wherein the window displaying the representation of the screen display of the host computing device is a graphical representation of a drag-and-drop target and wherein the instructions to transmit the selected data comprise instructions to stream the selected data from the viewer computing device to the drag-and-drop target on the host computing device.

34. The article of manufacture of claim 29 further comprising instructions to cause the viewer computing device to communicate via the Internet.

35. The article of manufacture of claim 29 wherein the data is a file.

36. An article of manufacture storing computer readable instructions thereon to cause a transfer of data from a host computing device to a viewer computing device using a drag-and-drop operation, the viewer computing device in communication with and located remotely from the host computing device and providing access to the host computing device through a window displaying a representation of the screen display of the host computing device on the viewer computing device, the article of manufacture comprising:

(a) instructions to receive, via an input device in electrical communication with the viewer computing device, user input indicating selection of data stored by the host computing device and dragging of the selected data out of the window displaying the representation of the screen display of the host computing device;

(b) instructions to transmit a notification to the host computing device that the selected data has been dragged out of the window displaying the representation of the screen display of the host computing device, the notification enabling the host computing device to create thereon, in preparation for the drag-and-drop transfer, a window that is not visible to a user of the viewer computing device;

(c) instructions to establish a link between the window that is not visible to the user of the viewer computing device and the window displaying the representation of the screen display of the host computing device;

(d) instructions to receive, via the input device, user input indicating that the selected data is dropped into a window associated with the viewer computing device;

(e) instructions to request the selected data from the window, on the host computing device, that is not visible to the user of the viewer computing device; and (f) instructions to receive the selected data from the host computing device in response to the execution of the instructions of (e).

37. The article of manufacture of claim 36 wherein the instructions to receive the selected data comprise instructions to receive actual data referred to by the selected data, the reference to the actual data being supplied by a drop source of the host computing device.

38. The article of manufacture of claim 37 wherein the reference to the actual data is a file path.

39. The article of manufacture of claim 36 wherein the window associated with the viewer computing device is a graphical representation of a drag-and-drop target and wherein the instructions to receive the selected data comprise instructions to receive a stream of the selected data by the drag-and-drop target of the viewer computing device from the host computing device.

40. The article of manufacture of claim 36 further comprising instructions to cause the viewer computing device to communicate via the Internet.

41. The article of manufacture of claim 36 wherein the data is a file.

42. An article of manufacture storing computer readable instructions thereon to cause a transfer of data from a viewer computing device to a host computing device using a drag-and-drop operation, the viewer computing device in communication with and located remotely from the host computing device and providing access to the host computing device through a window displaying a representation of the screen display of the host computing device on the viewer computing device, the article of manufacture comprising:
- (a) instructions to register the window displaying the representation of the screen display of the host computing device as a drop target;
- (b) instructions to receive, via an input device in electrical communication with the viewer computing device, user input indicating selection of data stored on the viewer computing device and dragging of the selected data into the registered drop target;
- (c) instructions to transmit a notification to the host computing device that the selected data has been dragged into the registered drop target, the notification enabling the host computing device to create thereon, in preparation for the drag-and-drop transfer, a window that is not visible to a user of the viewer computing device;
- (d) instructions to establish a link between the window that is not visible to the user of the viewer computing device and the registered drop target;
- (e) instructions to receive, via the input device, user input indicating that the selected data is dropped onto the registered drop target; and
- (f) instructions to transmit the selected data to the host computing device in response to the host computing device requesting the selected data from the window that is not visible to the user of the viewer computing device.

43. The article of manufacture of claim 42 further comprising instructions to convert the format of the selected data prior to transmitting the selected data.

44. The article of manufacture of claim 42 wherein the instructions to transmit the selected data comprise instructions to transmit actual data referred to by the selected data, the reference to the actual data being supplied by a drop source of the viewer computing device.

45. The article of manufacture of claim 44 wherein the reference to the actual data is a file path.

46. The article of manufacture of claim 42 wherein the instructions to transmit the selected data comprise instructions to stream the selected data from the viewer computing device to a drop target on the host computing device.

47. The article of manufacture of claim 42 further comprising instructions to cause the viewer computing device to communicate via the Internet.

48. The article of manufacture of claim 42 wherein the data is a file.

49. An article of manufacture storing computer readable instructions thereon to cause a transfer of data from a host computing device to a viewer computing device using a drag-and-drop operation, the viewer computing device in communication with and located remotely from the host computing device and providing access to the host computing device through a window displaying a representation of the screen display of the host computing device on the viewer computing device, the article of manufacture comprising:
- (a) instructions to register the window displaying the representation of the screen display of the host computing device as a drop source;
- (b) instructions to receive, via an input device in electrical communication with the viewer computing device, user input indicating selection of data stored on the host computing device and dragging of the selected data out of the registered drop source;
- (c) instructions to transmit a notification to the host computing device that the selected data has been dragged out of the registered drop source, the notification enabling the host computing device to create thereon, in preparation for the drag-and-drop transfer, a window that is not visible to a user of the viewer computing device;
- (d) instructions to establish a link between the window that is not visible to the user of the viewer computing device and the registered drop source;
- (e) instructions to receive, via the input device, user input indicating that the selected data is dropped into another window of the viewer computing device;
- (f) instructions to request the selected data from the window, on the host computing device, that is not visible to the user of the viewer computing device; and
- (g) instructions to receive the selected data from the host computing device in response to the execution of the instructions of (f).

50. The article of manufacture of claim 49 wherein the instructions to receive the selected data comprises instructions to receive actual data referred to by the selected data, the reference to the actual data being supplied by a drop source of the host computing device.

51. The article of manufacture of claim 50 wherein the reference to the actual data is a file path.

52. The article of manufacture of claim 49 wherein the other window of the viewer computing device is a graphical representation of a drag-and-drop target and wherein the instructions to receive the selected data comprise instructions to receive a stream of the selected data by the drag-and-drop target of the viewer computing device.

53. The article of manufacture of claim 49 further comprising instructions to cause the viewer computing device to communicate via the Internet.

54. The article of manufacture of claim 49 wherein the data is a file.

* * * * *